United States Patent [19]

Yoneda

[11] Patent Number: 4,535,064
[45] Date of Patent: Aug. 13, 1985

[54] CERAMIC COMPOSITIONS FOR A REDUCTION-REOXIDATION TYPE SEMICONDUCTING CAPACITOR

[75] Inventor: Yasunobu Yoneda, Kyoto, Japan

[73] Assignee: Murata Manufacturing Co., Ltd., Kyoto, Japan

[21] Appl. No.: 613,628

[22] Filed: May 24, 1984

[30] Foreign Application Priority Data

May 25, 1983 [JP] Japan ................................ 58-93095
May 25, 1983 [JP] Japan ................................ 58-93097
Jul. 11, 1983 [JP] Japan ............................... 58-126500

[51] Int. Cl.$^3$ ............................................. C04B 35/46
[52] U.S. Cl. ................................. 501/138; 501/139; 252/520; 252/521
[58] Field of Search .................... 501/134, 138, 139; 252/520, 521

[56] References Cited

U.S. PATENT DOCUMENTS 4,014,707  3/1977  Tonaka et al. .................. 501/139

FOREIGN PATENT DOCUMENTS 1113407  8/1961  Fed. Rep. of Germany ...... 501/138
0050615  4/1980  Japan .................................. 501/138

*Primary Examiner*—Howard S. Williams
*Attorney, Agent, or Firm*—Finnegan, Henderson, Farabow, Garrett & Dunner

[57] ABSTRACT

Ceramic compositions having (1) a mixture comprised of barium titanate, zirconium oxide and one or more of cerium oxide, neodymium oxide, lanthanum oxide and an oxide of at least one of lanthanides having atomic numbers 59 to 66 in specific ratios and (2) 0.01 to 0.4% by weight (calculated as Mn based on the weight of the mixture) manganese oxide. Such compositions form reduction-reoxidation type semiconducting capacitors of reduced size and increased capacitance per unit area.

4 Claims, No Drawings

CERAMIC COMPOSITIONS FOR A REDUCTION-REOXIDATION TYPE SEMICONDUCTING CAPACITOR

BACKGROUND OF THE INVENTION

1. FIELD OF THE INVENTION

This invention relates to barium titanate ceramic compositions suitable for production of reduction-reoxidation type semiconducting capacitors.

2. DESCRIPTION OF THE PRIOR ART

Conventional semiconducting capacitors include a grain boundary insulating portion obtained by diffusing Cu, Bi, Mn, etc. into the grain boundaries of crystalline semiconductor ceramics, a surface barrier layer and a reduction-reoxidation surface layer of a semiconducting ceramic.

The grain boundary insulating portions of the semiconducting capacitors are produced from $BaTiO_3$ and $SrTiO_3$ ceramics, and in recent years, the $SrTiO_3$ ceramics have been mainly used because of their better temperature and bias characteristics. Capacitors of this type also have the advantage that their characteristics vary little with a change in the type of electrode used, and they are highly reliable. However, their cost is high because they are produced by a complex manufacturing process. Moreover, their breakdown voltage is low, and their capacitance per unit area cannot be made high.

With the surface barrier layer-type semiconducting capacitors, a relatively large capacitance per unit area can be obtained but they have a relatively low breakdown voltage and low insulation resistance and this limits the range of their application.

Generally, reduction-reoxidation type semiconducting ceramic capacitors have the advantage that is typical of the grain boundary insulating type and surface barrier layer type semiconducting ceramic capacitors. Namely their capacitance per unit area is much greater than conventional dielectric ceramic capacitors so they can be manufactured in a small size with a large capacitance. Advances in electronics technology have led to great demand for capacitors of reduced size and increased capacitance. However, when an attempt is made to obtain a capacitance of at least $0.7\ \mu F/cm^2$ by using a conventional barium titanate semiconducting ceramic composition for a reduction-reoxidation type semiconducting ceramic capacitors, the breakdown voltage or insulation resistance of the capacitors are drastically reduced. Hence, the capacitance of such capacitors can be increased only to about $0.5\ \mu F/cm^2$ at the highest.

Generally, a reduction-reoxidation semiconducting ceramic capacitor is made by heat-treating a ceramic composition composed of a solid solution such as $BaTiO_3$-$La_2O_3$-$TiO_2$ with an oxide of manganese added thereto. This composition is subjectd to a reducing atmosphere to convert it into a semiconductor, then the semiconductor is heat-treated in an oxidizing atmosphere to form a dielectric re-oxidized layer on the surface of the semiconductor, and then the electrodes are applied. Accordingly, its electrical properties, such as capacitance, insulating resistance, breakdown voltage and temperature characteristics, depend greatly upon the re-oxidized dielectric layer formed on the surface of the semiconductor ceramic. In order, therefore, to increase the capacitance per unit area of semiconductor ceramics of the same composition, the re-oxidized layer on the surface of the semiconductor ceramics should be reduced in thickness. A reduction in the thickness of the re-oxidized layer, however, results in a reduction in breakdown voltage and insulation resistance.

To reduce size and increase capacitance and simultaneously to increase breakdown voltage and insulation resistance, the following three conditions should be met simultaneously.

(1) The dielectric constant of the dielectric ceramic should be high.

(2) The ceramic should be dense structure and have a small and uniform crystal grain size, (3) The speeds of reduction and reoxidation should be high.

With the conventional composition mentioned above, however, reduction of the crystal grain size results in a dielectric constant of as low as about 8000 to 10000. To increase the dielectric constant to more than 12000, on the other hand, requires crystal grain sizes of as large as 3 $\mu m$ or more. Thus, when the capacitance is increased to $0.7\ \mu F/cm^2$ or higher, the breakdown voltage or insulation resistance of reduction-reoxidation type semiconducting ceramic capacitors is drastically reduced so that they become useless for practical purposes.

SUMMARY OF THE INVENTION

It is an object of this invention to provide a ceramic composition for a reduction-reoxidation type semiconducting capacitor, which has a high dielectric constant, is dense, has a fine and uniform crystal grain size, and can be easily reduced and re-oxidized.

Another object of this invention is to provide a ceramic composition for reduction-reoxidation type semiconducting ceramic capacitors which are not reduced in breakdown voltage or insulating resistance even when their capacitance per unit area is increased.

According to a first aspect of this invention, there is provided a ceramic composition for a reduction-reoxidation type semiconducting capacitors, comprising (1) a mixture of barium titanate ($BaTiO_3$), cerium oxide ($CeO_2$), zirconium oxide ($ZrO_2$) and optionally neodymium oxide ($Nd_2O_3$) and (2) 0.01 to 0.4% by weight (calculated as Mn based on the weight of the mixture (1)) manganese oxide.

According to a second aspect of this invention, there is provided a ceramic composition for reduction-reoxidation type semiconducting capacitors, comprising (1) a mixture of barium titanate ($BaTiO_3$), cerium oxide ($CeO_2$), lanthanum oxide ($La_2O_3$) and zirconium oxide ($ZrO_2$), and (2) 0.01 to 0.4% by weight (calculated as Mn based on the weight of the mixture (1) manganese oxide.

According to a third aspect of this invention, there is provided a ceramic composition for reduction-reoxidation type semiconducting capacitor, comprising (1) a mixture of barium titanate ($BaTiO_3$), an oxide of at least one lanthanide of atomic numbers 59 to 66, and zirconium oxide ($ZrO_2$), and (2) 0.01 to 0.4% by weight (calculated as Mn based on the weight of the mixture (1)) manganese oxide.

DESCRIPTION OF THE PREFERRED EMBODIMENTS

The invention first provides a ceramic composition for a reduction-reoxidation type semiconducting capacitors, comprising (1) a mixture of 79.0 to 98.0 mole % barium titanate ($BaTiO_3$), 1.0 to 6.0 mole % cerium oxide ($CeO_2$) and 1.0 to 15.0 mole % zirconium oxide ($ZrO_2$), and (2) 0.01 to 0.4% by weight manganese oxide, calculated as Mn based on the weight of the mixture (1), and a ceramic composition for reduction-reoxidation type semi-conducting capacitors, comprising (1) a mixture of more than 78.5 mole % but less than 98.0 mole % barium titanate, 1.0 to 6.0 mole % cerium oxide ($CeO_2$), less than 0.5 mole % neodymium oxide ($Nd_2O_3$) and 1.0 to 15.0 mole % of zirconium oxide ($ZrO_2$), and (2) 0.01 to 0.4% by weight manganese oxide, calculated as Mn based on the weight of the mixture (1).

The proportions of the components in the above compositions are limited for the following reasons (1) If the proportion of $CeO_2$ is less than 1.0 mole %, there is no shift in the Curie point, and the dielectric constant of the ceramic composition at room temperature is low. Furthermore, since the sinterability of the ceramic composition becomes poor, as a result both the insulation resistance (IR) breakdown voltage (Vb) become low and the dielectric loss tangent (tan $\delta$) becomes high when the area capacitance reaches as high as 0.7 F/cm$^2$. If it exceeds 6.0 mole %, the dielectric constant, IR and Vb are lowered.

(2) If the proportion of $ZrO_2$ is less that 1.0 mole %, the sinterability of the ceramic composition becomes poor and the tan $\delta$ increases and Vb is lowered. If it exceeds 15.0 mole %, the dielectric constant is lowered, and fusion of the ceramic occurs.

(3) The proportion of $BaTiO_3$ is determined by the proportions of $CeO_2$, $ZrO_2$ and optionally $Nd_2O_3$. Outside the specified range, the dielectric constant, IR and Vb are lowered as can be seen from the results obtained for sample Nos. 11 and 14 of Example 1 given hereinbelow.

(4) The addition of manganese oxide is effective for improving IR, increasing Vb and improving tan $\delta$. If the proportion of manganese oxide (as Mn) is less than 0.01% by weight, there is no effect of adding manganese oxide. If it exceeds 0.4% by weight, the dielectric constant of the ceramic is reduced. If, therefore, the dielectric layer is reduced in thickness in order to increase the area capacitance, both IR and Vb are lowered.

(5) The presence of $Nd_2O_3$ in the main component serves to improve the sinterability of the ceramic composition further. If its proportion is at least 0.5 mole %, the crystal grain size of the ceramic increases and Vb is lowered.

It has been confirmed that the same effect can be obtained when $La_2O_3$ or $Pr_2O_3$ is included instead of $Nd_2O_3$ or $Nd_2O_3$ is partly replaced by at least one of $La_2O_3$ or $Pr_2O_3$ in the ceramic composition according to the first embodiment.

According to the second embodiment, there is provided a ceramic composition for reduction-reoxidation type semiconducting capacitors comprising (1) a mixture of more than 78.7 mole % but less than 98.0 mole % barium titanate ($BaTiO_3$), 1.0 to 6.0 mole % cerium oxide ($CeO_2$), less than 0.3 mole % lanthanum oxide ($La_2O_3$) and 1.0 to 15.0 mole % of zirconium oxide ($ZrO_2$), and (2) 0.01 to 0.4% by weight manganese oxide, calculated as Mn based on the weight of the mixture (1).

The proportions of the components in the above composition in accordance with the second embodiment are limited for the following reasons.

(1) The proportion of $CeO_2$ is limited for the same reason as stated in (1) described hereinabove with respect to the first embodiment.

(2) $La_2O_3$ is effective for improving sinterability. If its proportion is at least 0.3 mole %, the crystal grain size of the ceramics increases and Vb is reduced.

(3) If the proportion of $ZrO_2$ is less than 1.0 mole % the sinterability of the ceramic composition becomes poor and the tan $\delta$ increases and Vb is lowered. If it exceeds 15.0 mole %, the dielectric constant is lowered and fusion of the ceramic occurs.

(4) The range of the proportion of $BaTiO_3$ is determined by $CeO_2$, $La_2O_3$ and $ZrO_2$. Outside the specified range, the dielectric constant, IR and Vb are lowered as can be seen from the results obtained for sample Nos. 1 and 4 of Example 2 given hereinbelow.

(5) The purpose of adding manganese oxide is the same as described in regard to the first embodiment, and the reason for limiting its proportion is also the same as described hereinabove.

It has also been confirmed that in the second embodiment, the same effect can be obtained if $La_2O_3$ is partly or wholly replaced by at least one of $Nd_2O_3$ and $Pr_2O_3$.

According to the third embodiment of the invention, there is provided a ceramic composition for a reduction-reoxidation type semiconductor ceramic capacitor, comprising (1) a mixture of 79.0 to 99.0 mole % barium titanate ($BaTiO_3$), 0.5 to 6.0 mole % of an oxide of at least one of the lanthanides having atomic numbers 59 to 66 and 0.5 to 15.0 mole % $ZrO_2$ and (2) 0.01 to 0.4% by weight manganese oxide calculated as Mn based on the weight of the mixture (1).

The proportions of the components in the ceramic composition according to the third embodiment are limited for the following reasons.

(1) The proportion of $BaTiO_3$ is determined by the lanthanide and $ZrO_2$ content. If the proportion of $BaTiO_3$ is outside the range of 79.0 to 99.0 mole %, the dielectric constant, breakdown voltage and insulation resistance of the ceramics are markedly reduced.

(2) The oxides of the lanthanides having atomic numbers 59 to 66, i.e. $Pr_2O_3$, $Nd_2O_3$, $Sm_2O_3$, $Eu_2O_3$, $Dy_2O_3$ and $Tb_2O_3$, also function as Curie point shifters. If the proportion of such a lanthanide oxide is less than 0.5 mole %, there is no shift in the Curie point, the dielectric constant at room temperature is lowered. Furthermore, the sinterability of the composition becomes poor. If the capacitance per unit area is increased to as high as 0.7 $\mu$F/cm$^2$, both the breakdown voltage and insulation resistance are lowered, and the dielectric loss tangent becomes large. If it exceeds 6.0 mole %, the dielectric constant is lowered and both the breakdown voltage and the insulation resistance are lowered.

(3) If the proportion of $ZrO_2$ is less than 0.5 mole %, the sinterability of the composition becomes poor, the dielectric loss tangent becomes high, and the breakdown voltage is lowered. If it exceeds 15 mole %, the dielectric constant is lowered, and fusion of the ceramic occurs.

(4) The purpose of adding manganese oxide is the same as described hereinabove with regard to the first embodiment, and the reason for limiting its proportion is also the same as described hereinabove.

According to the ceramic compositions of this invention, cerium oxide and zirconium oxide (the first and second embodiments) or zirconium oxide and the oxide of a lanthanide such as praseodymium oxide (the third embodiment) are used as Curie point shifters. Consequently, as compared with conventional ceramic composition (containing $Nd_2O_3$ or $La_2O_3$ as a Curie point shifter, the compositions of the invention have a dielectric constant of as high as 15000 or higher, a uniform crystal grain size of as small as 1.0 to 1.5 μm or less despite their high dielectric constant, good sinterability, a dense structure and are easy to reduce and re-oxidize. Hence, they fully meet the aforesaid requirements for the production of reduction-reoxidation type semiconducting ceramic capacitors of small size and large capacitance. For example, as will be shown in the Examples given hereinbelow, there can be obtained capacitors having a capacitance of at least 0.7 μF/cm², a breakdown voltage of at least 400 V and an insulating resistance of at least about $10^{10}$ ohms.

A semiconductor ceramic capacitor can be produced from the compositions of this invention by mixing predetermined proportions of the raw materials in powder form, molding the mixture, sintering the molded article in an oxidizing atmosphere, heat-treating the sintered product in a reducing atmosphere to convert it into a semiconducting ceramic, thereafter heat-treating the ceramic in an oxidizing atmosphere to form a thin dielectric layer on its surface, and further applying electrodes to its surface.

The resulting semiconducting ceramic capacitor is of small size and large capacitance and has a high insulation resistance and a high breakdown voltage while having a hitherto-unprecedented high capacitance per unit area.

The following Examples illustrate the present invention more specifically.

EXAMPLE 1

In each run, $BaTiO_2$, $CeO_2$, $Nd_2O_3$, $ZrO_2$ and $MnCO_3$ were weighed so as to provide a composition having the constituent proportions indicated in Table 1. These materials were put into a container and mixed together with an organic binder such as vinyl acetate for 16 hours. The mixture was dehydrated and dried, and its particle size was made uniform by passing the dried mixture through a 50-mesh sieve. The mixture was then molded into a disc having a diameter of 10 mm and a thickness of 0.5 mm under a pressure of 1000 kg/cm², and then sintered in air at 1300° to 1360° C. for 2 hours. The resulting dielectric ceramic was heat-treated at 1000° to 1200° C. for 2 hours in a reducing atmosphere (of $N_2$ with 20% $H_2$) to form a semiconducting ceramic. The semiconducting ceramic was heat-treated in the air (the oxidizing atmosphere) at 850° to 1000° C. for 2 hours to form a thin dielectric layer on the surface of the semiconducting ceramic. A silver paste was coated on the surface of the semiconducting ceramic and baked at 700° to 850° C. for 30 minutes to form electrodes. Thus, a reduction-reoxidation type semiconducting capacitor was obtained.

The average ceramic crystal grain size, dielectric constant, capacitance [C(μF/cm²)], dielectric loss tangent [tan δ (%)], insulation resistance [IR (ohms)] and breakdown voltage [Vb (V)] of the resulting capacitor were measured. The results are summarized in Table 1.

The capacitance and dielectric loss tangent were measured at 0.1 V r.m.s. and 1 KHz. Since the capacitance varies with the reducing temperature and the reoxidation temperature, the reducing temperature was prescribed so that the specific resistance of the ceramic after reduction became constant, and also the capacitance per unit area was set at 0.7 μF/cm² by presetting the reoxidation temperature. Thus, the capacitors were evaluated by the other electrical properties for easy comparison.

The insulation resistance was measured by applying a D.C. voltage of 12 V.

The breakdown voltage was measured by the D.C. booster breakdown method according to JIS C 5102.

The dielectric constant was measured at 1.0 V r.m.s. and 1 KHz, and the measuring temperature was 20° C. as a standard.

In Tables 1 to 3, the asterisked samples are outside the scope of the invention, and non-marked samples are within the scope of the invention.

TABLE 1

| Sample No. | Component (mol %) | | | | Additive (wt %) | Ceramic Properties | | Characteristics of the Semiconducting Capacitor | | | |
|---|---|---|---|---|---|---|---|---|---|---|---|
| | $BaTiO_3$ | $CeO_2$ | $Nd_2O_3$ | $ZrO_2$ | Mn | Dielectric Constant | Average Particle Size (μm) | C (μF/cm²) | Tan δ (%) | IR (Ω) | Vb (v) |
| 1* | 94.5 | 0.5 | 0 | 5.0 | 0.1 | 6000 | 1.4 | 0.7 | 6.5 | $6.0 \times 10^6$ | 70 |
| 2 | 94.0 | 1.0 | 0 | 5.0 | 0.1 | 12800 | 1.3 | 0.7 | 3.0 | $3.0 \times 10^{10}$ | 440 |
| 3 | 92.0 | 3.0 | 0 | 5.0 | 0.1 | 14000 | 1.0 | 0.7 | 2.6 | $3.5 \times 10^{10}$ | 510 |
| 4 | 89.0 | 6.0 | 0 | 5.0 | 0.1 | 12200 | 1.0 | 0.7 | 1.9 | $1.9 \times 10^{10}$ | 410 |
| 5* | 88.0 | 7.0 | 0 | 5.0 | 0.1 | 7500 | 0.9 | 0.7 | 1.8 | $8.0 \times 10^7$ | 90 |
| 6* | 96.5 | 3.0 | 0 | 0.5 | 0.1 | 5900 | 1.0 | 0.7 | 8.0 | $4.0 \times 10^5$ | 75 |
| 7 | 96.0 | 3.0 | 0 | 1.0 | 0.1 | 12000 | 1.0 | 0.7 | 3.0 | $1.8 \times 10^{10}$ | 460 |
| 8 | 87.0 | 3.0 | 0 | 10.0 | 0.1 | 13200 | 1.2 | 0.7 | 2.8 | $3.0 \times 10^{10}$ | 450 |
| 9 | 82.0 | 3.0 | 0 | 15.0 | 0.1 | 12500 | 1.6 | 0.7 | 2.5 | $2.0 \times 10^{10}$ | 430 |
| 10* | 81.0 | 3.0 | 0 | 16.0 | 0.1 | 8100 | 1.9 | 0.7 | 5.0 | $6.0 \times 10^7$ | 60 |
| 11* | 99.0 | 0.5 | 0 | 0.5 | 0.1 | 5500 | 1.6 | 0.7 | 7.5 | $4.0 \times 10^4$ | 400 |
| 12 | 98.0 | 1.0 | 0 | 1.0 | 0.1 | 12000 | 1.3 | 0.7 | 3.0 | $3.1 \times 10^{10}$ | 430 |
| 13 | 79.0 | 6.0 | 0 | 15.0 | 0.1 | 12300 | 1.4 | 0.7 | 1.9 | $2.0 \times 10^{10}$ | 410 |
| 14* | 78.0 | 7.0 | 0 | 15.0 | 0.1 | 6000 | 1.5 | 0.7 | 1.9 | $6.0 \times 10^4$ | 80 |
| 15* | 92.0 | 3.0 | 0 | 5.0 | 0.005 | 14000 | 1.0 | 0.7 | 4.8 | $7.5 \times 10^6$ | 85 |
| 16 | 92.0 | 3.0 | 0 | 5.0 | 0.01 | 14100 | 1.0 | 0.7 | 2.6 | $2.3 \times 10^{10}$ | 410 |
| 17 | 92.0 | 3.0 | 0 | 5.0 | 0.4 | 12100 | 1.3 | 0.7 | 2.4 | $3.3 \times 10^{10}$ | 450 |
| 18* | 92.0 | 3.0 | 0 | 5.0 | 0.45 | 8000 | 1.9 | 0.7 | 5.2 | $6.5 \times 10^7$ | 110 |
| 19 | 91.8 | 3.0 | 0.2 | 5.0 | 0.1 | 13300 | 1.3 | 0.7 | 2.4 | $3.5 \times 10^{10}$ | 480 |
| 20 | 91.6 | 3.0 | 0.4 | 5.0 | 0.1 | 13200 | 1.5 | 0.7 | 2.5 | $2.5 \times 10^{10}$ | 400 |
| 21* | 91.5 | 3.0 | 0.5 | 5.0 | 0.1 | 12300 | 3.7 | 0.7 | 2.5 | $1.8 \times 10^9$ | 100 |

It is clear from Table 1 that the ceramic compositions of this invention can provide semiconducting capacitors having excellent electrical properties. Specifically, in spite of the fact that the capacitance of the capacitors per unit area is as high as 0.7 μF/cm², they have a breakdown voltage of at least 400 V, an insulation resistance of at least $10^{10}$ ohms, and a dielectric loss tangent of not more than 3.0%. It was also confirmed that variations in the breakdown voltage were little.

With a conventional $BaTiO_2$-$La_2O_3$-$TiO_2$ system, the capacitance per unit area is 0.4 to 0.5 F/cm² at the highest if an insulation resistance of $10^{10}$ ohms that can normally be obtained, and the breakdown voltage is about 300 V. In contrast in accordance with this invention, reduce and re-oxidize. These are the main reasons why the compositions of the invention give capacitors having such excellent electrical properties.

EXAMPLE 2

The same procedure as in Example 1 was repeated except that $BaTiO_3$, $CeO_2$, $La_2O_3$, $ZrO_2$ and $MnCO_3$ were used as the raw materials. The results are summarized in Table 2.

TABLE 2

| Sample No. | Component (mol %) | | | | Additive (wt %) | Ceramic Properties | | Characteristics of the Semiconducting Capacitor | | | |
|---|---|---|---|---|---|---|---|---|---|---|---|
| | $BaTiO_3$ | $CeO_2$ | $La_2O_3$ | $ZrO_2$ | Mn | Dielectric Constant | Average Particle Size (μm) | C (μF/cm²) | Tanδ (%) | IR (Ω) | Vb (v) |
| 1* | 77.9 | 7.0 | 0.1 | 15.0 | 0.1 | 7000 | 1.6 | 0.7 | 2.7 | $3.0 \times 10^6$ | 60 |
| 2 | 78.9 | 6.0 | 0.1 | 15.0 | 0.1 | 12100 | 1.4 | 0.7 | 2.3 | $1.2 \times 10^{10}$ | 410 |
| 3 | 97.9 | 1.0 | 0.1 | 1.0 | 0.1 | 12000 | 1.3 | 0.7 | 3.0 | $1.3 \times 10^{10}$ | 400 |
| 4* | 98.4 | 1.0 | 0.1 | 0.5 | 0.1 | 7000 | 1.7 | 0.7 | 7.5 | $5.0 \times 10^5$ | 75 |
| 5* | 94.4 | 0.5 | 0.1 | 5.0 | 0.1 | 7500 | 1.4 | 0.7 | 7.0 | $6.5 \times 10^5$ | 80 |
| 6 | 93.9 | 1.0 | 0.1 | 5.0 | 0.1 | 12100 | 1.2 | 0.7 | 3.0 | $1.5 \times 10^{10}$ | 430 |
| 7 | 88.9 | 6.0 | 0.1 | 5.0 | 0.1 | 12200 | 1.1 | 0.7 | 2.2 | $1.6 \times 10^{10}$ | 400 |
| 8* | 87.9 | 7.0 | 0.1 | 5.0 | 0.1 | 6500 | 1.0 | 0.7 | 1.9 | $2.5 \times 10^5$ | 110 |
| 9* | 96.4 | 3.0 | 0.1 | 0.5 | 0.1 | 7000 | 1.1 | 0.7 | 5.6 | $7.0 \times 10^4$ | 95 |
| 10 | 95.9 | 3.0 | 0.1 | 1.0 | 0.1 | 12000 | 1.1 | 0.7 | 3.0 | $1.5 \times 10^{10}$ | 430 |
| 11 | 81.9 | 3.0 | 0.1 | 15.0 | 0.1 | 12100 | 1.5 | 0.7 | 2.9 | $2.0 \times 10^{10}$ | 410 |
| 12* | 80.9 | 3.0 | 0.1 | 16.0 | 0.1 | 6500 | 1.9 | 0.7 | 4.5 | $4.0 \times 10^6$ | 100 |
| 13 | 91.95 | 3.0 | 0.05 | 5.0 | 0.1 | 14000 | 1.3 | 0.7 | 2.8 | $3.5 \times 10^{10}$ | 460 |
| 14 | 91.8 | 3.0 | 0.2 | 5.0 | 0.1 | 13500 | 1.5 | 0.7 | 2.7 | $3.0 \times 10^{10}$ | 400 |
| 15* | 91.7 | 3.0 | 0.3 | 5.0 | 0.1 | 12100 | 3.8 | 0.7 | 2.8 | $4.0 \times 10^6$ | 90 |
| 16* | 91.9 | 3.0 | 0.1 | 5.0 | 0.005 | 14300 | 1.0 | 0.7 | 4.0 | $6.0 \times 10^5$ | 85 |
| 17 | 91.9 | 3.0 | 0.1 | 5.0 | 0.01 | 14000 | 1.0 | 0.7 | 3.0 | $1.8 \times 10^{10}$ | 410 |
| 18 | 91.9 | 3.0 | 0.1 | 5.0 | 0.4 | 12000 | 1.5 | 0.7 | 2.4 | $1.7 \times 10^{10}$ | 400 |
| 19* | 91.9 | 3.0 | 0.1 | 5.0 | 0.45 | 8000 | 2.3 | 0.7 | 3.5 | $5.0 \times 10^5$ | 95 | capacitors having a capacitance of 0.7 μF/cm² and a breakdown voltage of at least 400 V can be obtained.

As is clearly seen from Table 1, the average crystal grain size of the ceramic is as fine as 1.0 to 1.5 μm and the grain size is uniform in spite of their high dielectric constant of at least 12,000. A cross-sections of the ceramic was polished to a mirror surface and the amount and distribution of pores inside were observed. The results showed the ceramics of the invention to have a higher density than conventional ones. Furthermore, the ceramic compositions of the invention are easy to As in Example 1, capacitors having excellent electrical properties can be obtained from the ceramic compositions of this invention prepared in Example 2. The reasons for the excellent electrical properties of the capacitors in Example 2 are the same as stated in Example 1.

EXAMPLE 3

The procedure of Example 1 was repeated except that $BaTiO_3$, $Pr_6O_{11}$, $ZrO_2$ and $MnCO_3$ were used as the raw materials. The results are summarized in Table 3.

TABLE 3

| Sample No. | Component (mol %) | | | | Additive (wt %) | Ceramic Properties | | Characteristics of the Semiconducting Capacitor | | | |
|---|---|---|---|---|---|---|---|---|---|---|---|
| | $BaTiO_3$ | $Pr_2O_3$ | $Sm_2O_3$ | $ZrO_2$ | Mn | Dielectric Constant (20° C.) | Average Particle Size (μm) | C (μF/cm²) | tanδ (%) | IR (Ω) | Vb (v) |
| 1* | 94.6 | 0.4 | 0 | 5.0 | 0.1 | 6300 | 1.4 | 0.7 | 6.5 | $6.0 \times 10^6$ | 70 |
| 2 | 94.5 | 0.5 | 0 | 5.0 | 0.1 | 12300 | 1.3 | 0.7 | 3.2 | $3.0 \times 10^{10}$ | 410 |
| 3 | 92.0 | 3.0 | 0 | 5.0 | 0.1 | 13500 | 1.1 | 0.7 | 2.6 | $3.0 \times 10^{10}$ | 500 |
| 4 | 89.0 | 6.0 | 0 | 5.0 | 0.1 | 12000 | 1.0 | 0.7 | 2.0 | $2.0 \times 10^{10}$ | 400 |
| 5* | 88.0 | 7.0 | 0 | 5.0 | 0.1 | 7000 | 0.9 | 0.7 | 1.8 | $6.0 \times 10^7$ | 90 |
| 6* | 96.5 | 3.0 | 0 | 0.4 | 0.1 | 5500 | 1.0 | 0.7 | 7.5 | $5.0 \times 10^5$ | 70 |
| 7 | 96.0 | 3.0 | 0 | 0.5 | 0.1 | 12000 | 1.0 | 0.7 | 3.0 | $2.0 \times 10^{10}$ | 430 |
| 8 | 87.0 | 3.0 | 0 | 3.0 | 0.1 | 12800 | 1.2 | 0.7 | 2.9 | $3.0 \times 10^{10}$ | 400 |
| 9 | 82.0 | 3.0 | 0 | 15.0 | 0.1 | 12100 | 1.5 | 0.7 | 2.7 | $3.5 \times 10^{10}$ | 400 |
| 10* | 81.0 | 3.0 | 0 | 16.0 | 0.1 | 7500 | 1.7 | 0.7 | 5.0 | $6.0 \times 10^7$ | 80 |
| 11* | 99.5 | 0.3 | 0 | 0.2 | 0.1 | 6500 | 1.7 | 0.7 | 7.0 | $3.5 \times 10^4$ | 70 |
| 12 | 99.0 | 0.5 | 0 | 0.5 | 0.1 | 12000 | 1.5 | 0.7 | 2.9 | $3.8 \times 10^{10}$ | 430 |
| 13 | 79.0 | 6.0 | 0 | 15.0 | 0.1 | 12100 | 1.4 | 0.7 | 2.0 | $1.5 \times 10^{10}$ | 410 |
| 14* | 78.0 | 7.0 | 0 | 15.0 | 0.1 | 5600 | 1.4 | 0.7 | 2.0 | $9.0 \times 10^4$ | 70 |
| 15* | 92.0 | 3.0 | 0 | 5.0 | 0.005 | 14000 | 1.0 | 0.7 | 4.9 | $4.0 \times 10^6$ | 80 |
| 16 | 92.0 | 3.0 | 0 | 5.0 | 0.01 | 13800 | 1.0 | 0.7 | 2.8 | $1.5 \times 10^{10}$ | 400 |
| 17 | 92.0 | 3.0 | 0 | 5.0 | 0.4 | 12000 | 1.5 | 0.7 | 2.6 | $3.3 \times 10^{10}$ | 400 |
| 18* | 92.0 | 3.0 | 0 | 5.0 | 0.45 | 8000 | 2.0 | 0.7 | 5.3 | $6.0 \times 10^7$ | 100 |
| 19* | 94.6 | 0 | 0.4 | 5.0 | 0.1 | 6500 | 1.3 | 0.7 | 7.0 | $5.0 \times 10^6$ | 65 |
| 20 | 94.5 | 0 | 0.5 | 5.0 | 0.1 | 12100 | 1.2 | 0.7 | 3.3 | $3.0 \times 10^{10}$ | 400 |
| 21 | 92.0 | 0 | 3.0 | 5.0 | 0.1 | 13600 | 1.0 | 0.7 | 2.7 | $3.0 \times 10^{10}$ | 460 |
| 22 | 89.0 | 0 | 6.0 | 5.0 | 0.1 | 12100 | 1.0 | 0.7 | 2.1 | $2.5 \times 10^{10}$ | 450 |

TABLE 3-continued

| Sample No. | Component (mol %) | | | | Additive (wt %) | Ceramic Properties | | Characteristics of the Semiconducting Capacitor | | | |
|---|---|---|---|---|---|---|---|---|---|---|---|
| | $BaTiO_3$ | $Pr_2O_3$ | $Sm_2O_3$ | $ZrO_2$ | Mn | Dielectric Constant (20° C.) | Average Particle Size (μm) | $C$ (μF/cm$^2$) | tan δ (%) | IR (Ω) | $V_b$ (v) |
| 23* | 88.0 | 0 | 7.0 | 5.0 | 0.1 | 7000 | 0.9 | 0.7 | 1.9 | $7.0 \times 10^6$ | 100 |

As in Example 1, capacitors having excellent electrical properties can be obtained from the ceramic compositions of this invention prepared in Example 3. The reason for the excellent electrical properties of the capacitors in Example 3 are the same as stated in Example 1.

While the invention has been described in detail and with reference to specific embodiments thereof, it will be apparent to one skilled in the art that various changes and modifications can be made therein without departing from the spirit and scope thereof.

What is claimed is:

1. A ceramic composition for a reduction-reoxidation type semiconducting capacitor, said composition comprising (1) a mixture of 79.0 to 98.0 mole % barium titanate, 1.0 to 6.0 mole % cerium oxide and 1.0 to 15.0 mole % zirconium oxide and (2) 0.01 to 0.4% by weight manganese oxide, calculated as Mn based on the weight of said mixture (1).

2. A ceramic composition for a reduction-reoxidation type semiconducting capacitor, said composition comprising (1) a mixture of more than 78.5 mole % but less than 98.0 mole % barium titanate, 1.0 to 6.0 mole % cerium oxide, less than 0.5 mole % neodymium oxide and 1.0 to 15.0 mole % zirconium oxide and (2) 0.01 to 0.4% by weight manganese oxide, calculated as Mn based on the weight of said mixture (1).

3. A ceramic composition for a reduction-oxidation type semiconducting capacitor, said composition comprising (1) a mixture of more than 78.7 mole % but less than 98.0 mole % barium titanate, 1.0 to 6.0 mole % cerium oxide, less than 0.3 mole % lanthanum oxide and 1.0 to 15.0 mole % zirconium oxide and (2) 0.01 to 0.4% by weight manganese oxide, calculated as Mn based on the weight of said mixture (1).

4. A ceramic composition for a reduction-reoxidation type semiconducting capacitor, said composition comprising (1) a mixture of 79.0 to 99.0 mole % barium titanate, 0.5 to 6.0 mole % of an oxide of at least one lanthanide having an atomic number of from 59 to 66 and 0.5 to 15.0 mole % zirconium oxide, and (2) 0.01 to 0.4% by weight manganese oxide, calculated as Mn based on the weight of said mixture (1).

* * * * *